Jan. 8, 1946.   A. H. HABERSTUMP   2,392,734
PLASTIC JOINT CONSTRUCTION
Filed Oct. 9, 1941   3 Sheets-Sheet 1
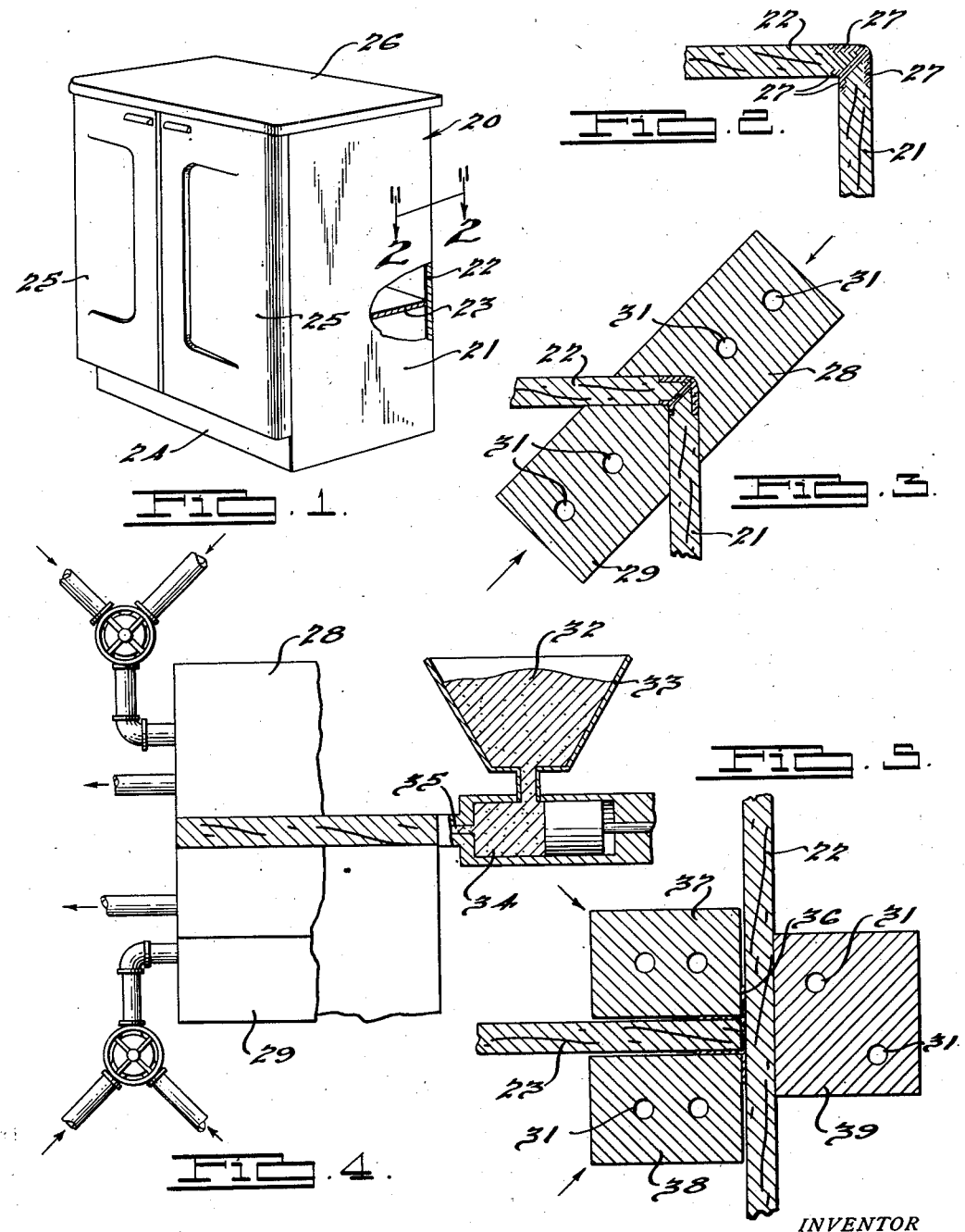
INVENTOR
*Alfred H. Haberstump.*
BY
*Harness, Dickey & Pierce*
ATTORNEYS.

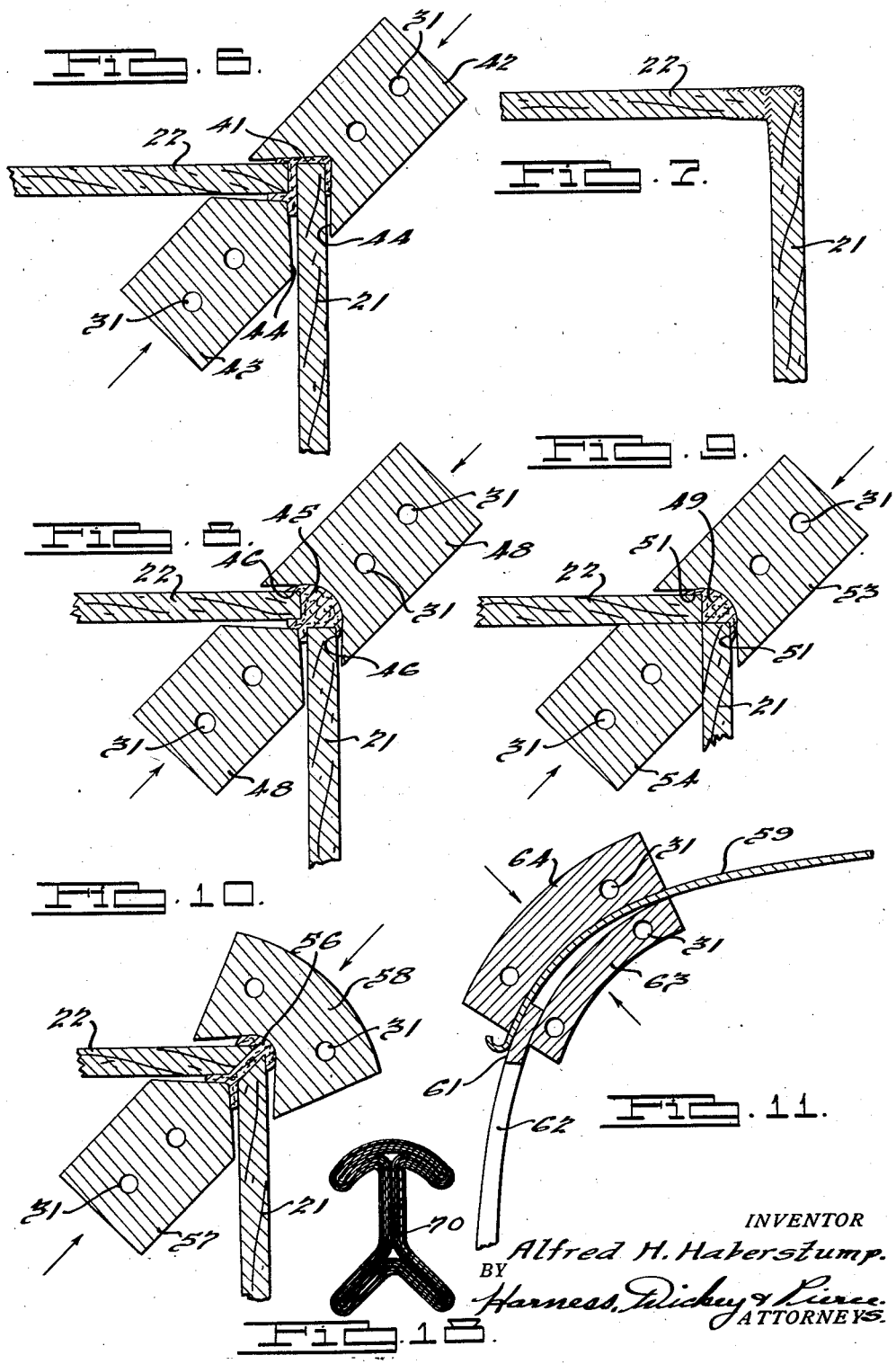

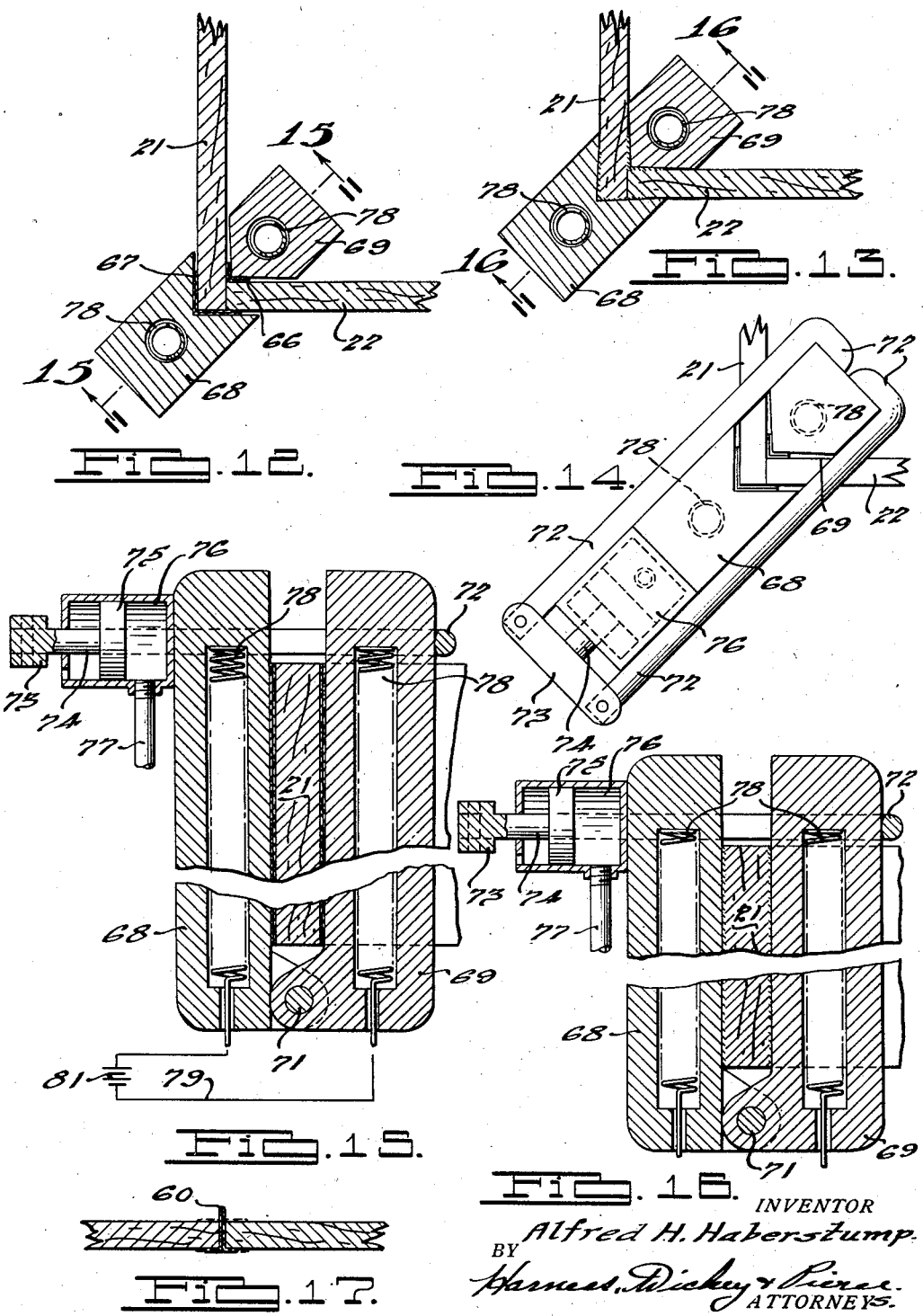

Patented Jan. 8, 1946

2,392,734

UNITED STATES PATENT OFFICE 2,392,734

PLASTIC JOINT CONSTRUCTION

Alfred H. Haberstump, Detroit, Mich., assignor to The Murray Corporation of America, Detroit, Mich., a corporation of Delaware Application October 9, 1941, Serial No. 414,230

10 Claims. (Cl. 154—42)

My invention relates to plastic joint constructions, and particularly to the method of bonding elements together to form a unit construction, and to the article so constructed.

Difficulty has been experienced in the past in assembling panels of wood and composite materials to form cabinets and other unit structures. Metal molding, brackets, glue, and the like were employed for securing the elements together. While such methods proved more or less satisfactory for retaining the elements in predetermined relation, a bonded construction was not provided thereby.

The present construction pertains to the bonding together of the panels, ribs, braces, etc., of an article made of metal, wood, or composite material to form a unit construction. The bonded material forms the joint between the elements the same as welding or brazing material joins metal elements together. Resinous materials, well known in the art, are employed for the bond and may be extruded, rolled or otherwise formed into strips of predetermined cross section which engage the elements and form a filler therebetween while adhering to the surface on either side of the joint. The resinous material may be forced under pressure into rabbeted corners of the elements to join them together while forming the corner thereof. Impregnated cloth, paper or the like may be folded to a predetermined cross section and placed between the elements with which it bonds upon the application of heat and pressure to form the joint therebetween.

Sets of dies are employed for heating and forming the resinous material, and the dies are moved together to compress the heated plastic material into predetermined shape and force it into intimate bonded relation with adjacent surfaces and the faces of the elements. Apertures may be provided in the dies through which steam is introduced for heating the dies faces and through which a coolant may be circulated thereafter for producing the rapid cooling of the bonded joint. Pivoted die blocks may be employed provided with one or more cylinders which draw the blocks together after the elements to be bonded have been disposed therebetween in predetermined relation to each other and the bonding material. Electrical heating elements may be disposed in the die blocks or apertures may be provided through which steam and water may be circulated. When employing the hinged die blocks the large presses usually used for heating and compressing the resinous materials are eliminated.

The bonding of the elements of an article to be assembled may be progressively accomplished or a series of the die blocks may be employed for bonding a plurality of the elements, or the entire unit may be assembled in a single heat and pressure applying operation of a device. Cabinets, airplane fuselages, wings and other assemblies, automobile bodies, and any article to be fabricated from material other than metal may be secured by my bonding process. In some instances metal panels may be bonded to the pillar or frame element formed of plastic material by my method. The process is different from the usual glueing of wood, as in furniture, since the bonding material actually forms the joint between the elements and is bonded to the surface of the element a considerable distance on every side of the joint. Glue is employed only between the mating faces of the pieces of wood and is not of itself a spacing material which forms a pillar-like element which is bonded to the faces adjacent to the joint.

Accordingly, the main objects of my invention are; to provide a method whereby elements made of materials other than metal may be securely bonded together and in some instances for bonding metal panels to each other; to bond elements together with a thermoplastic resinous material which forms the joint between the elements and extending flanges on the surfaces thereof adjacent to the joint; to provide thermoplastic strips of predetermined cross section which encompasses the edges of the elements which are to be bonded together which securely adhere to the edges of the elements at the joint and to the surface adjacent thereto after heat and pressure has been applied thereto; to form a joint between elements made of material other than metal having edges spaced from each other and rabbeted for receiving a bonding material which is forced into the space of the joint and the rabbeted areas for forming the corner pillar therebetween while bonding the two elements together; to provide a pair of die blocks for pressing the bonding material at the joint between a pair of elements which has pressure applying means for drawing the die blocks together when heat is applied thereto for setting the resinous material and bonding it securely to surface areas adjacent to the joint; and in general, to secure a plurality of elements together to form a unit construction by a bonding method which is simple in application and which forms a rigid construction.

Other objects and features of novelty of my invention will be either specifically pointed out or will become apparent when referring, for a better understanding of my invention, to the following description taken in conjunction with the accompanying drawings, wherein:

Figure 1 is a broken perspective view of a cabinet built from a plurality of elements by a process embodying my invention;

Fig. 2 is an enlarged broken sectional view of the structure illustrated in Fig. 1, taken on the line 2—2 thereof;

Fig. 3 is a view of structure, similar to that illustrated in Fig. 1, with the heating and forming dies in engagement therewith.

Fig. 4 is a broken sectional view, in elevation, of a device for introducing the resinous material under pressure into the assembled structure illustrated in Fig. 3;

Fig. 5 is a sectional view of structure to be bonded together and the dies for producing the bond illustrating another form which the method of my invention may assume;

Fig. 6 is a view of structure similar to that illustrated in Fig. 3 showing a still further form of my invention;

Fig. 7 is a view of the structure illustrated in Fig. 6 after the bonding operation;

Fig. 8 is a view of structure illustrating a further form which my invention may assume;

Fig. 9 is a sectional view of structure showing a still further form of my invention;

Fig. 10 is a view of structure illustrating a still further form of my invention;

Fig. 11 is a sectional view of an automobile roof, header and rib assembly joined together by a bonding method embodying my invention;

Fig. 12 is a sectional view of a corner joint between two elements before the bonding operation practiced by my method;

Fig. 13 is a view of the structure illustrated in Fig. 12, after the bonding operation has been completed;

Fig. 14 is an end view of the structure illustrated in Fig. 12;

Fig. 15 is a sectional view of the structure illustrated in Fig. 12, after the clamping of the die blocks but before the heating of the bonding material;

Fig. 16 is a view of the structure illustrated in Fig. 15, after the heating operation and the die blocks have been moved to apply pressure to the bonding material;

Fig. 17 is a section view of a pair of elements to be secured together by a T-shaped bonding strip of my invention, and Fig. 18 is an enlarged view of a bonding strip, similar to that illustrated in Fig. 10 showing a further form thereof.

In Fig. 1, I have illustrated a cabinet 20 having side walls 21, a back wall 22, a plurality of shelves 23, a front sill portion 24, a pair of doors 25, and a top 26. The cabinet and the elements which make up the cabinet, are of conventional form, the novelty thereof being embodied in the method of securing the elements of the cabinet together, and the resulting bonded cabinet.

In Figs. 2, 3, and 4, I have illustrated one method of joining the side panel 21 to the rear panel 22. The ends of the panel are spaced apart and provided with rabbets 27 to permit the free flow of the thermoplastic material into the space provided thereby. A pair of die blocks 28 and 29 are movable toward each other to engage the panels and exert material pressure thereon during the bonding operation. Apertures 31 are provided in the die blocks through which steam or other heating medium is circulated to heat the die blocks for softening the bonding material and through which a coolant may be circulated for cooling the bonding material thereafter.

In Fig. 4, I have illustrated a pressure molding device wherein the thermoplastic material 32 is disposed in a hopper 33 from which it passes into a pressure cylinder 34 which is heated. The material while plastic is introduced through a nozzle 35 into the space formed between the ends of the elements being bonded together and the rabbets 27 disposed adjacent thereto. The die blocks 28 and 29 first engage the walls of the material to define the open space produced by the rabbeted areas into which the material 32 is forced. After the material 32 is forced into the space under pressure it is thereafter cooled by the application of cooling fluid through apertures 31 of the die blocks. It will be noted from Fig. 2 that the bonded material itself forms the corner of the cabinet and that this material is extended and bonded to the rabbeted surface of the elements 21 and 22 to form a rigid joint with the elements. The bonding process as practiced by my method is similar to the brazing or welding process employed to secure two pieces of metal together. My bonding process is extended beyond the welding process since my bonding material forms the corner pillar which blends with the surface of the adjacent elements.

In Fig. 5, I have illustrated a method which I employ for attaching the shelf 23 to the side and back panels. In this arrangement the bonding material is extruded, folded from impregnated sheets, or otherwise formed into channel shape with extending flanges as illustrated at 36 in the figure. The shelf 23 is inserted in the channel portion and the web of the channel and the extending flanges abut against the surface of the side and back panels. Die blocks 37, 38, and 39 are forced toward each other as heat is applied through the apertures 31 of the block to force the heated plastic material into the material of the shelf and panels. After the bonding material has cooled and the blocks removed, the shelf is securely fastened to the panels by a permanent bond.

In Figs. 6 and 7, I have illustrated a corner of a cabinet or other article formed by the panel elements 21 and 22, having a bonding strip 41 of double channel section. Die blocks 42 and 43 provide pressure and heat for softening the bonding material and forcing it along the inner and outer surface of the elements. It will be noted that the surface 44 of the dies is slightly tapered so as to have the bonding material taper from the corners to the faces of the elements. When the material of the elements 21 and 22 is compressible the taper on the die faces may be eliminated. This is illustrated in Fig. 7 where the bonding material separates the two elements and projects across the end of the element 21 and across the inner surface of both elements. This securely retains the two elements together and forms a smooth corner surface which is continuous with that of the elements.

In Fig. 8, a bonding strip 45 is illustrated having channel slots 46 in which the ends of the elements 21 and 22 project. Die elements 47 and 48 heat and form the bonding material into a solid corner pillar of bonding material, with flanges extending outwardly along the surface of the elements to blend therewith and to be bonded rigidly thereto.

In Fig. 9, I have illustrated elements 21 and 22 as having one corner abutted with the bonding strip 49 provided with two grooves 51 in which the elements lie. A die 53 contacts the bonding strip while a die 54 backs up the elements 21 and 22. The application of heat and pressure forces the material into the areas between elements 21 and 22 and bonds the material to the ends of the elements and to adjacent areas.

In Fig. 10, the elements 21 and 22 are illustrated as being mitered on an angle of 45 degrees with the ends spaced apart when projected in slots in the sides of a bonding strip 56. A die block 57 engages the portion of the strip projecting on the inner sides of the elements 21 and 22 while a die block 58 engages and forms the bonding material projecting on the outside of the elements. The die blocks are heated by the passage of steam through the mentioned apertures 31 and, upon heating the bonding material, moves inwardly to force the material into the end and side face of the elements 22 while blending the material with the surface thereof and shaping the corner between the elements.

In Fig. 11, I have illustrated a further application of my bonding method as applied to articles other than the cabinets hereinbefore described. A plastic roof panel 59 for an automotive vehicle has a header bar 61 and pillar 62 secured thereto. The bonding material is extruded or formed to engage the under surface of the roof and the base and side edges of the header bar and pillar element. Die blocks 63 and 64, of predetermined form, have heat applied through the apertures 31 as they are forced toward each other to intimately bond the roof panel 59, the pillar 62 and the header bar 61 into permanent relationship to each other. Many other applications, such as wings, fuselages, ailerons, and like parts of airplanes, and many other articles may be fabricated by my method.

It is to be understood that the strips of the bonding material herein referred to may be extruded from suitable extrusion dies to the various shapes desired, some of which have been herein illustrated by way of example. It is also to be understood that impregnated paper, fabric, and other material may be folded into the shape desired and used in the same manner as the extruded strips. By way of example, I have illustrated strips 66 and 67, formed by folding the impregnated material a plurality of times into predetermined angle shape. The strips are placed at the corner between the elements 21 and 22 and die blocks 68 and 69 are employed to apply heat and pressure to the joint. The folded strips 66 and 67 become plastic and are forced into the surface of the elements 21 and 22 to form a smooth, permanent bond therewith.

In Figs. 14, 15, and 16, I have illustrated the die blocks 68 and 69 as being secured together at one end by a pivot 71 and at the other end by a pair of clamps 72 which are attached to a link 73 on the end of a piston rod 74. The piston rod is secured to a piston 75 which is disposed within a pressure cylinder 76 into which a fluid under pressure is introduced, through a conduit 77. The corner formed by the elements 71 and 72 and the strips of material 66 and 67 are placed within die blocks which are swung together and secured by the clamps 72. Fluid pressure is then introduced into the cylinder 76 for drawing the dies together.

A pair of electrically operated heating units 78 are mounted in the die blocks connected by a circuit 79 to a source of electric energy 81. As the impregnated material of the strips 66 and 67 is heated by the die blocks the blocks are moved toward each other by the pressure in the cylinder 76 which forces the material of the strips into intimate engagement with the material of the elements 21 and 22.

In Fig. 15, the relationship of the parts is illustrated before the application of heat, while in Fig. 16 the final position of the die blocks is illustrated after the strips have become plastic and compressed. It is to be understood that an additional cylinder element may be provided on the pivoted end of the dies when the pivot operates in a slot to have the two die blocks moved bodily toward each other under the application of pressure at both ends.

In Figs. 17 and 18, strips 60 and 70 are illustrated which are similar in section to the extruded strips of the figures but which differ therefrom in that they are formed from sheets of impregnated material which is folded and shaped into the forms shown. The impregnated material in sheet form may be folded in various ways to produce any type of section desired for a bonding strip.

The various elements which are secured together to produce a unit article may be joined together in sections by portable die structure, such as illustrated in Figs. 12 to 16 inclusive, or in a small press constructed for that purpose. The parts may also be assembled in a single device in which the die elements are mounted for simultaneously heating and moving toward the joints being formed. The joints produced in this manner are extremely rigid since they are formed by the bonding material which is disposed between the ends of the elements and flange outwardly therefrom to be embedded and securely adhered to adjacent areas on the surfaces thereof. The pillars and header bars of automotive vehicles may be joined in this manner to each other and to the body roof. Ribs, struts and other elements of airplane sections may be secured to each other in a similar manner. My particular method permits the securing of non-metallic sheets together as readily as the securing of metal sheets together by brazing and welding, and in some applications may be employed to provide framing for sheets of metal into which the material of the framing bonds.

What I claim is:

1. The method of bonding non-metallic elements together which includes the steps of; applying a thermo-plastic material in a thin sheet between the ends of the element to be joined and over the surface adjacent thereto, and bonding the material to the ends and to the areas adjacent to the joint under the application of heat and pressure which compacts the elements as the material is embedded therein to provide a smooth area in continuation of the surfaces of the elements.

2. The method of joining elements together which includes the steps; of assembling the elements with thermo-plastic material disposed therebetween and over the surface adjacent thereto, and of bonding the material to the elements and to the surfaces adjacent thereto through the application of heat and pressure to embed the material in the elements which is compacted thereby.

3. The method of bonding elements together which includes the steps; of assembling the elements with a strip of thermo-plastic material therebetween and over adjacent surfaces on both sides of the elements, and of bonding the strip to the edge portions of the elements and the adjacent surfaces on both sides of the elements under the application of heat and pressure which blends the material with that of the elements which is compacted thereby.

4. In an article fabricated from a plurality of non-metallic panels which includes, in combination, spaced adjacent panels, and bonding material forming corners therebetween, said bonding material having flanges which are embedded in and bonded to the surface of the panels adjacent to the corners.

5. A strip for bonding elements together which includes, in combination, a plurality of layers of sheets of material impregnated with a thermoplastic substance and having recesses therein for receiving the adjacent edges of the elements and encompassing the adjacent side surfaces thereof.

6. The method of securing two elements together in extension of each other, which includes assembling the elements with a T-shaped bonding strip between adjacent edges of the element with the top cross member portion extending over the adjacent surfaces thereof, and bonding the strip to the edges and to the surfaces upon the application of heat and pressure while deforming the material of the elements to provide a smooth surface at the bond.

7. The method of forming a joint between two elements disposed at an angle to each other which includes the steps, of assembling angle shaped strips of thermoplastic material between the adjacent edges and over the adjacent surfaces of the abutted elements, and applying heat and pressure to the strips and elements to force the material of the strips into the material of the elements while shaping the material to blend with the surfaces thereof.

8. An article formed of panels disposed at an angle to each other and joined by compressed thermo-plastic material which is bonded to adjacent edges of the panels and which is embedded in adjacent surfaces thereof to provide a continuous surface at the corner therebetween.

9. An article formed of panels with thermoplastic material bonded therebetween and over the adjacent surfaces of the panels in which it is embedded, the surfaces of the material and panels being disposed substantially in a common plane.

10. In an article fabricated from a plurality of nonmetallic panels which includes, in combination, spaced adjacent panels, and bonding material forming a joint therebetween, said bonding material extending over the surface adjacent to the joint and being embedded in and bonded to said panels, the surface of the embedded material and that of the panels being disposed substantially in a common plane.

ALFRED H. HABERSTUMP.